Feb. 9, 1971 H. HECKSCHER ET AL 3,561,859

OPTICAL APPARATUS AND METHODS FOR VIEWING OR DISPLAYING IMAGES

Filed Feb. 14, 1968 3 Sheets-Sheet 1

HELMUT HECKSCHER
AND PETER F. MUELLER
INVENTORS

BY ALFRED H. ROSEN
AND JOHN H. COULT
ATTORNEYS

OPTICAL APPARATUS AND METHODS FOR VIEWING OR DISPLAYING IMAGES

Filed Feb. 14, 1968 3 Sheets-Sheet 2

HELMUT HECKSCHER
AND PETER F. MUELLER
INVENTORS
BY ALFRED H. ROSEN
AND JOHN H. COULT
ATTORNEYS

Feb. 9, 1971 H. HECKSCHER ET AL 3,561,859

OPTICAL APPARATUS AND METHODS FOR VIEWING OR DISPLAYING IMAGES

Filed Feb. 14, 1968 3 Sheets-Sheet 3

HELMUT HECKSCHER
AND PETER F. MUELLER
INVENTORS

BY ALFRED H. ROSEN
AND JOHN H. COULT
ATTORNEYS

United States Patent Office 3,561,859

Patented Feb. 9, 1971

3,561,859

OPTICAL APPARATUS AND METHODS FOR VIEWING OR DISPLAYING IMAGES

Helmut Heckscher, Newton Center, and Peter F. Mueller, Concord, Mass., assignors to Technical Operations, Incorporated, Burlington, Mass., a corporation of Delaware Filed Feb. 14, 1968, Ser. No. 705,524
Int. Cl. G03b 5/18, 21/00
U.S. Cl. 353—25 8 Claims

ABSTRACT OF THE DISCLOSURE

This application depicts, inter alia, methods and apparatus for selectively retrieving one or more of a plurality of images stored in superposition upon a record in respective multiplication with spatially periodic modulation of unique azimuthal orientation. Ways are shown for varying the relative intensity of the retrieved images. Disclosed embodiments of the invention are adapted for viewing or displaying in natural or selectively distorted color a scene recorded on black and white film as three superimposed color separation images respectively modulating a spatial carrier of distinct angular orientation. Yet another embodiment is adapted for viewing or displaying a selected one or more of a large number of different scene images which have been recorded in superposition on a common recording medium in respective multiplication with an angularly unique spatial carrier.

BACKGROUND OF THE INVENTION

Optical display or viewing systems have been devised which are capable of analyzing and synthesizing superimposed carrier modulated record images through the use of coherent illuminating radiation and spatial filtering techniques. Such a system is shown in a patent issued to Bocca, No. 2,050,417 (reissued as Reissue No. 20,748). In such a system, the spatial frequency spectra associated with the respective component record images are impressed upon a carrier and caused to be spatially separated in a Fourier transform space created within the optical system. Each diffraction order is spaced from the system optical axis a radial distance which is a function of the carrier frequency employed.

By the sampling theorem, the carrier frequency governs the bandwidth of object spatial frequencies which may be transmitted through the system. In such prior art systems the limiting aperture of the system must be sufficiently large to transmit at least the first diffraction order associated with each of the diffraction patterns produced. It follows, then, that the effective aperture of the system places a limitation on the maximum carrier frequency which may be used, and thus, on the resolution of the displayed or viewed images.

Further, the number of images which may be recorded and then separately retrieved with a given spatial frequency bandwidth, is again a function of the carrier frequency employed. Thus, the size of the limiting aperture of the optical system also imposes an effective constraint upon the number of images which may be recorded and separately retrieved.

Systems have been devised which are capable or retrieving carrier modulated color separation images to form full color reconstructions, and yet which do not have the described aperture limitations. Pat. No. 755,983, Wood, and an article by H. E. Ives appearing in the Aug. 3, 1906 issue of the British Journal of Photography, describe such systems. The Wood and Ives systems each utilize the phenomena that the diffraction angle of a spectral order is directly proportional to the spatial frequency of the carrier employed and the wavelength of the illuminating radiation. By carrier-frequency coding the scene colors and carefully calculating and controlling the carrier frequencies, object magnification and other relative parameters, the diffracted spatial frequency spectrum associated with each of the primary color separation images formed by light having a mean wavelength of the corresponding color are caused to overlap in a Fourier transform space. Thus, an aperture located at this point in the transform space acting as a spatial filter, will transmit the color separation spectra in the corresponding wavelength illumination which is necessary to view or display a full color reconstruction.

However, numerous drawbacks attend the use of such methods. The very restricted bandwidth (relative to the carrier frequency used) of spatial frequencies which may be transmitted compels the use of extremely high frequency spatial carriers if reasonably high resolution reconstructions are to be produced. Registering the diffracted color separation spectra is a problem. The use of in-line, frequency modulated carriers introduces serious cross-talk effects. Ives describes light generating apparatus producing a number of light sources, but the multiple sources are used to increase the luminance of the displays (Ives used the sun as a light source) and are not capable of providing selective adjustment of the intensity of the separately retrieved images. Such an adjustment would, in fact, be impossible with the Ives reconstructor since each source effects retrieval of all stored images. A reconstructor concept utilizing oblique illumination similar to that taught by Ives is also suggested by D. Gabor in Pat. No. 3,108,383.

OBJECTS OF THE INVENTION

It is the object of this invention to provide viewing or display apparatus and methods by which a selected one or any desired combination of superimposed, carrier modulating component record images may be retrieved simultaneously for viewing or display. It is another object to provide methods and apparatus by which the effective aperture of an embodied optical system does not place a significant constraint on either the resolution of the retrieved images or on the number of images which may be additively superimposed on the recording medium.

It is yet another object to separately color code and control the relative energy of the retrieved component record images.

It is still another object to provide methods and systems capable of meeting the above-stated objectives, and yet which are not attended by the above-described deficiencies in prior art techniques.

Further objects and advantages of the invention will in part be obvious and will in part become apparent as the following description proceeds.

The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein.

DESCRIPTION OF THE PREFERRED EMBODIMENTS

FIG. 1–4 show various embodiments of the invention enabling the retrieval of one or a selected combination of superimposed carrier-modulated component record images. Before discussing these embodiments, however, in order to better understand the invention and its significance, a brief discussion of the general nature of the storage and recovery techniques with which this invention is involved, will be first engaged.

Figures 5, 6A, 6B, 6C, 6D, 7, 8, 9:
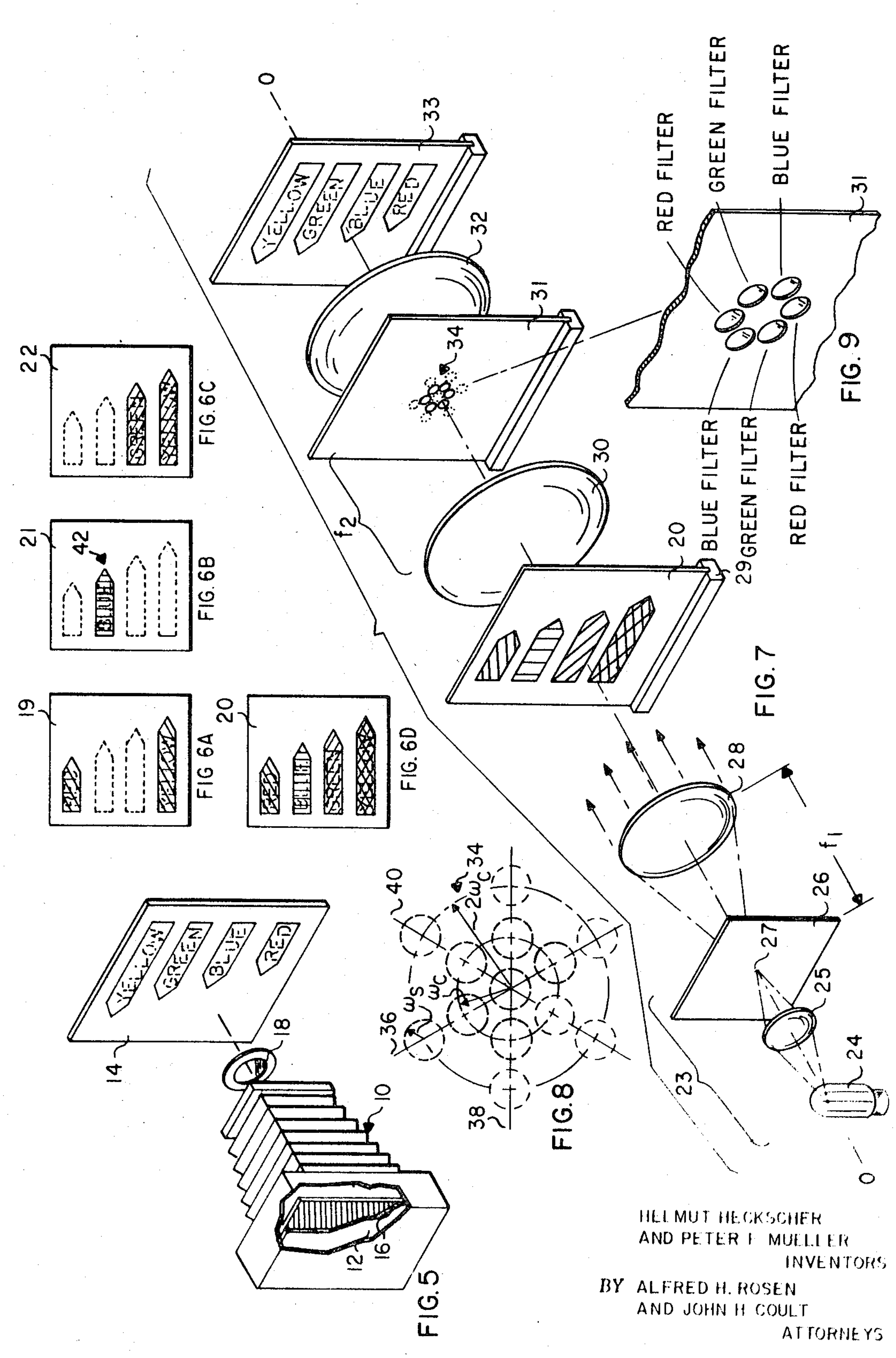
FIG. 5 is a distorted scale schematic perspective view of a colored object and a photographic camera which might be used for forming carrier modulated color separation records of the object; the view shows the camera partially broken away to reveal photographic recording material and a diffraction grating which would be otherwise hidden within the interior of the camera.
FIGS. 6A–6D show individual and composite color separation records of the photographed object, each of the individual records being associated with a particular zone of the visible spectrum and with a periodic modulation distinctive by its relative angular orientation.
FIG. 7 is a distorted scale schematic perspective view of prior art projection display apparatus for displaying photographic records of the above-described type.
FIG. 8 is a schematic view of a Fraunhofer diffraction pattern which might be formed by the FIG. 7 apparatus.
FIG. 9 is a schematic perspective view, enlarged and broken away, of a spatial filter shown in FIG. 7.

FIG. 5 shows in very schematic form a photographic camera 10 which might be employed to form a spectral zonal spatially periodically modulated photographic record. The record may be formed as a composite of three separate color separation exposures of a photosensitive film 12 in the camera 10. The separate color separation records thus formed are respectively associated with a spatial periodic modulation, imposed, for example, by a diffraction grating 16 adjacent the film 12, which is unique in terms of its relative azimuthal orientation.

FIG. 5 depicts the first step of a multi-step operation for forming such a composite record. An object 14, illustrated as having areas of predominantly yellow, green, blue, and red spectral reflectance characteristics, as labeled, is photographed through a filter 18 having a spectral transmittance peak in the red region of the visible spectrum. A grating 16 having a line orientation sloping, for example, at 30° to the horizontal, from upper right to lower left (as the grating would appear if viewed from the back of the camera), is juxtaposed with the film 12 to effect a superposition of a shadow image of the grating 16 on the red light image of object 14. The resulting color separation record 19 associated with the red content in the object 14, processed to a positive, for example by reversal processing techniques, would appear as shown in FIG. 6A. It is seen from FIG. 6A that the grating modulation is superimposed upon the object detail associated with light having a red spectral content. Note that because of the red constituent of yellow light, the yellow area in the object 14 is also imaged with superimposed grating lines of like angular orientation.

To complete the information of a composite photographic record, as shown in FIG. 6D at 20, color separation exposures are then made successively through a filter having a spectral transmittance characterized by a blue dominant wavelength with a diffraction grating oriented vertically, and then finally through a filter having a spectral transmittance dominant in the green region of the spectrum with a diffraction grating having a grating orientation sloping from the upper left to lower right, for example, at 30° to the horizontal.

It is seen from FIG. 6B that the blue color separation record 21 does not result in the exposure of any part of the film 12 not associated with blue content in the object 14; however, on exposure to the object 14 through a green filter, the yellow area is again exposed with grating image superimposed thereon with an orientation associated with the green color separation record 22. Thus, as shown in FIG. 6D, the object area having yellow spectral content has superimposed thereon spatially periodic modulations associated with both the red and green color separation records.

Apparatus for displaying such a photographic record is known to the prior art and may take the form shown in FIG. 7. Such display apparatus includes a source 23 of at least partially coherent light, illustrated as comprising an arc lamp 24, a condenser lens 25, and a mask 26 having an aperture 27 of restricted diameter. A lens 28 is provided for effectively transporting the point light source formed to a far field, either real or virtual. A film holder 29 for supporting a transparency record to be displayed, a transform lens 30 (explained below), a Fourier transform filter 31 (explained below), a projection lens 32, and a display screen 33 completes the display apparatus.

Upon illumination of a transparency record, such as composite record 20 in film holder 29, as a result of diffraction and interference phenomena and the relative angular displacement between the periodic modulations respectively associated with the color separation records 19, 21, and 22, three angularly displaced multi-order diffraction patterns, collectively designated by reference numeral 34, will be produced, as shown, for example, in the schematic illustration in FIG. 8. Each of the separate diffraction patterns associated with a separate color separation record comprises a zeroth order which is spatially coextensive with the zeroth order (undiffracted) components of each of the other patterns, and a plurality of higher order (diffracted) components representing a Dirac delta function array convolved with a spatial frequency spectrum characterizing the particular color separation record.

By the use of transform lens 30 these diffraction patterns are formed a focal length from the lens 30 in a space commonly known as the Fourier transform space or Fraunhofer diffraction plane. It is thus termed because of the spatial and temporal frequency analysis which is achieved in this space by the described diffraction and interference effects. Through the use of spatial and spectral filtering of these patterns in the transform plane, one or more of the discrete records may be displayed, for example, to achieve a reconstitution of the original scene in true or selectively distorted color.

The nature of the Fourier transform space and the effects that may be achieved by spatial filtering alone or by spatial and spectral filtering in this space of a selected diffraction order or orders may be understood by reference to FIG. 8. FIG. 8 shows three angularly separated diffraction patterns corresponding to the red, blue, and green light object spatial frequency spectra lying along axes labeled 36, 38, and 40 respectively. Each of the axes 36 38, and 40 is oriented orthogonally to the periodic modulation on the associated color separation record. The diffraction patterns share a common zero order location but have spatially separated higher orders.

By the nature of diffraction phenomena, the diffraction angle $\alpha$ is:

$$\sin \alpha = \lambda \omega \quad (1)$$

where $\lambda$ represents the spectral wavelength of the illumination radiation and $\omega$ represents spatial frequencies. Assuming the light at the film gate 29 to be collimated (although this is not a necessary condition) the diffraction orders will be formed in the transform space at the delta function positions determined by the transform of the record modulation at radial distances from the pattern axis:

$$R = f_2 m \omega_c \lambda \quad (2)$$

where $f_2$ is the focal length of lens 30; $\lambda$ is the mean wavelength of the illuminating radiation; $m$ represents the diffraction order; and $\omega_c$ is the fundamental grating frequency.

The first orders of each of the diffraction patterns can be considered as being an object spatial frequency spectrum of maximum frequency $\omega_s$ (representing a radius of the order) convolved with a carrier of spatial frequency $\omega_c$. The second order components can be thought of as being the convolution of an object spectrum having a maximum spatial frequency $\omega_s$ with a carrier having a spatial frequency of $2\omega_c$, and so forth. Thus, the various orders of each diffraction pattern may be thought of as being harmonically related, with a spatial frequency $\omega_c$, or an even multiple thereof, acting as a carrier for the spectrum of spatial frequencies characterizing the object detail. Two orders only are shown; however, it should be understood that even higher orders are present, but will be of increasingly less intensity.

Spatial filtering of the diffraction pattern is achieved by placing the apertured transform filter 31 in the transform space, as shown in FIG. 7. Since the zeroth order components of the diffraction patterns are spatially coextensive, the spatial frequencies contained in the zeroth order information channel represents the sum of the spectra respectively associated with each of the color separation records, 19, 21, and 22. Thus an opening in the transform filter 31 at the zeroth order location would result in a composite image of object 14 being formed in black, white, and tones of grey. Because the information channels associated with each of the color separation records are inseparably commingled in the zeroth order, they cannot be properly recolored to effect a faithful color reproduction of the photographed object. However, at the higher orders, because of the angular displacement of the red, blue, and green- associated axes 36, 38, and 40, the proper spectral characteristic may be added to each of the information channels by appropriate spectral filtering.

FIG. 9 represents an enlargement of a central portion of filter 31, illustrating appropriate spatial filtering apertures with the correct spectral filters to effect a true color reproduction of the object. It should be understood, of course, that higher order components, appropriately spectrally filtered, could also be passed, if desired. However, to maintain the discussion at a fundamental level, utilization of only the first order diffraction components has been illustrated.

Consider now a trace of the projection illumination as it traverses the projection system. The lamp 24 and condenser lens 25 are designed to evenly illuminate aperture 27 in mask 26 with a beam of maximum intensity broadband luminous energy. Lens 28 is shown spaced axially from mask 26 a distance substantially equal to its focal length in order that the light illuminating the film gate is substantially collimated. Transform lens 30 collects the substantially planar wavefronts in the zeroth order and diffracted higher orders and brings them to a focus in transform space in or near the aperture of the projection lens 32. The lenses 28 and 30 may be thus thought of as cooperating to image the illuminated aperture 27 in mask 26 on the transform filter 31.

As suggested above, prior art display and/or viewing systems, such as the one just described, are severely limited in their performance capabilities by the effective limiting aperture of the optical system employed. Utilizing an axial light source to illuminate a carrier-modulated record has the well-known effect that the spectra respectively associated with the different component record images appears in the transform space at a radial distance from the optical axis which is a function of the mean wavelength of the illuminating radiation, the system magnification, and more importantly, the frequency of the spatial carrier. It is useful for a number of reasons, in optical storage and retrieval systems of the type described to maximize the spatial carrier frequency to which the component record images are modulated. An important reason is based on the sampling theorem which says, in effect, that the bandwidth of the spectrum of object spatial frequencies which may be transmitted upon a carrier is a direct function of the carrier frequency. For this reason alone, it is usually advantageous to maximize the spatial carrier frequency in order to achieve the optimum resolution of the reconstructed or viewed images.

Another important reason for wanting to use the highest possible modulation frequency concerns the fact that the spatial coherence requirements of the illuminating radiation (and thus the effective size of the source) decrease with increasing carrier frequency. Third, as the number of carrier-modulated images which are additively superimposed on the record is increased, the carrier frequency must be commensurately increased if a given object spatial frequency bandwidth is to be preserved. This is easily seen if one thinks of the diffraction orders as forming a generally circular array in the Fourier transform space—the more orders which are to be included in the array while preserving the same order radius (the same spatial frequency bandwidth), the greater must be the radius of the array, and thus the carrier frequency.

By this invention, we provide methods and apparatus by which the diffracted orders of the component record images which are desired to be retrieved are each located upon the optical axis, irrespective of the particular carrier frequency at which the image or images are modulated or the number of images stored on the record. Thus, the effective aperture of the optical system is not a significant constraint as in prior art systems, since it must be only great enough to pass a bandwidth of spatial frequencies no greater than the carrier frequency.

Further, by this invention we provide means for controlling the temporal spectral bandwidth and the relative intensity of the retrieved component record images, and thus greatly improve the flexibility and usefulness of the viewing or display apparatus.

Figures 1, 1A, 1B, 3, 4, 4A:
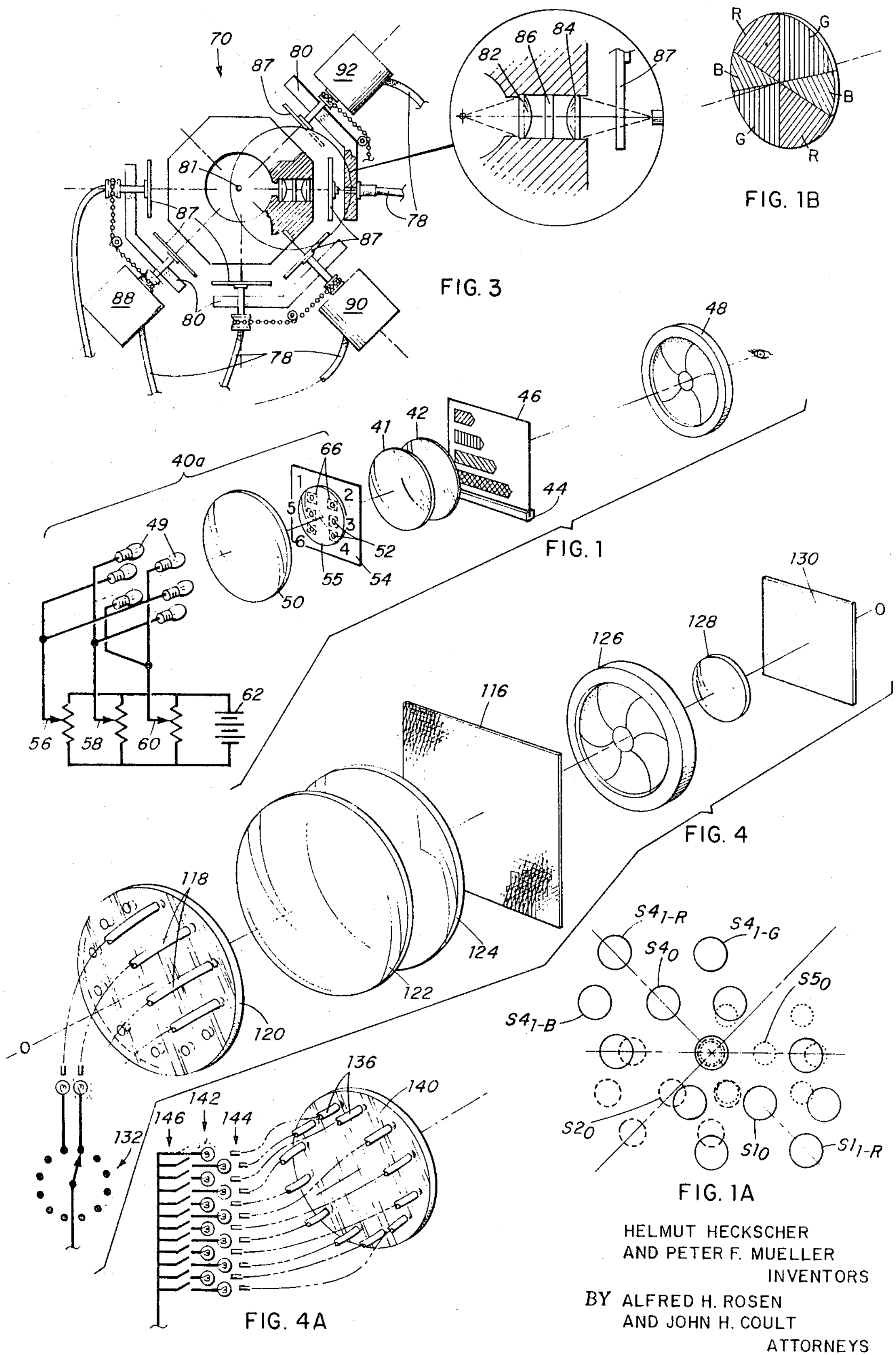
FIG. 1 is a distorted scale schematic perspective view of viewing apparatus which embodies the principles of this invention.
FIG. 1A is a schematic view of a Fraunhofer diffraction pattern which might be produced by the FIG. 1 system.
FIG. 1B is a view of a sectored color filter wheel which may be used in the FIG. 1 system.
FIG. 3 is a top view of a section of the FIG. 2 apparatus in which a plurality of effective point sources of partially coherent light are generated.
FIGS. 4 and 4A are distorted scale schematic perspective views of yet other implementations of the invention which enable one or a selected combination of superimposed component record images to be retrieved.

FIG. 1 schematically shows viewing apparatus which may be constructed to implement the principles of this invention. FIG. 1 shows light source means 40a for generating a plurality of light sources of restricted size (hereinafter termed point light sources), a collimating lens 41, a transform lens 42, a film gate 44 for supporting a record 46, and an iris-type diaphragm 48 located in the Fourier transform space produced by the transformer lens 42.

In more detail, the light source means is shown as comprising six incandescent lamps 49 angularly spaced around the optical axis 0—0 in a generally hexagonal array. A condensing lens 50 images the incandescent lamps 49 upon an appropriately located array of apertures 52 of restricted size in a mask 54. Thus there is created an array of six effective point sources distributed around the optical axis 0—0. A field lens 55 at the mask 54 minimizes light losses. For reasons which will become apparent hereinafter, diametrically opposed pairs of the incandescent lamps 49 are electrically connected to variable resistors 56, 58, and 60 connected in parallel across a battery 62. Adjustment of any one of the variable resistors 56, 58, or 60, will thus cause the luminous energy output of the connected pair of lamps 49 to vary throughout a chosen luminance range, which range preferably includes zero to enable selected lamp pairs to be energized to the exclusion of the remaining pairs.

The collimating and transform lenses 41 and 42 function to image the array of effective point sources formed at the mask 54 in a space commonly termed the Fourier transform space at which the diaphragm 48 is located.

Assume the record 46 to be a composite color separation record substantially the same as the record 20 forming a part of the described FIG. 7 system but with the modulation vectors assuming a 0°–45°–135° configuration rather than the 0°–60°–120° geometry of the spatial carrier on the respective color separation images on the record 20. Illustration of the record 46 by the beam from each of the point light sources produces respective diffraction patterns of the record at the focal plane of the lens 42. Each pattern is eccentrically located with respect to the optical axis, as shown in the enlarged schematic view (FIG. 1A) of the composite diffraction pattern, each pattern having a first harmonic diffraction order located on the optical axis. The light sources in each of the cooperating pairs of sources, because they are diametrically arranged, each cause a first harmonic diffraction order of the same color separation image to fall on the optical axis.

The azimuth on which each of the point sources (and source pairs) lie must be caused to be aligned with the azimuth of the direction vector of the component record image desired to be retrieved. There are many ways by which the necessary azimuthal correlation of light source and record carrier vector may be achieved. In the FIG. 1 embodiment, the angular geometry of the fixed light sources and the orientation of the record carrier vectors are interdependent. Accordingly, the pairs of apertures 52 and carrier vectors each have a 0°–45°–135° configuration. A single source, or a diametrically arranged pair of sources, might be actually (or effectively) rotated to consecutively retrieve different ones of the images stored on the composite record. Yet another alternative is to fix the azimuthal position of the light source (or pair of sources) and rotate the record.

Each of the effective point light sources created at the mask 54 has a predetermined radial spacing from the optical axis 0—0 which is carefully calculated such that the record-illuminating beam attributable to that point source has an effective angular displacement relative to the optical axis which is appropriate to locate a predetermined diffraction order upon the optical axis. Thus, as can be seen from Equation 2 above, consideration must be taken of the focal length of lens 42, the carrier frequency and the mean wavelength of the illuminating radiation.

It is seen that by this invention, the magnitude of the carrier frequency has no appreciable effect on the required size of the system aperture; but merely on the radial locations of the effective point sources.

Consider the effect of the wavelength of the illuminating radiation. It is necessary, of course, that if true color reconstructions of the original scene are to be viewed (or displayed), that each of the separately retrieved color separation images must be retrieved in light having a dominant wavelength related to the characteristic color of that color separation record. To this end we provide red, blue, and green spectrical filters 66 arranged in diametrically opposed pairs over the mask aperture pairs designated for retrieval of the like color separation images. Alternatively, a sectored filter wheel as shown in FIG. 1B might be provided in juxtaposition with the rear surface of the mask 54.

As seen from Equation 2, the greater the wavelength of the illuminating radiation, the greater the diffraction angle, and hence the greater must be the radial displacement from the axis of the associated light source. Accordingly, as shown in FIG. 1, the apertures 52 labeled 1 and 4, designated for retrieval of the red (long wavelength) color separation image from the record 46, are spaced a greater radial distance from the axis 0—0 than the apertures (labeled 2 and 5) associated with the green color separation image which are in turn at a greater radial distance than the apertures (labeled 3 and 6) for retrieval of the blue color separation image.

Refer again to the portrayal in FIG. 1A of the composite diffraction pattern formed in Fourier transform space. In order to keep the illustration as simple as possible, FIG. 1A shows only the diffraction patterns produced by the effective point sources 1 and 4 (the red sources), 2 (a green source), and 5 (a blue source). The fundamental (zero) order images of light sources 1, 2, 4, and 5 designated $S1_0$, $S2_0$, $S4_0$, and $S5_0$, respectively, are shown distributed about the pattern center located on the optical axis 0—0, each image having a radial location proportional to the mean wavelength of the radiation producing that image. Thus, $S4_0$, a red source image, is spaced farther from the axis than $S2_0$, a green source image. Certain of the non-zero diffraction orders are labeled to illustrate the composition of the total pattern. For example, first diffraction orders produced by source 4 and characterizing red, blue, and green color separation spectra are resignated $S4_{1-R}$, $S4_{1-B}$, and $S4_{1-G}$, respectively. FIG. 1A clearly shows first diffraction order spectra of each of the three color separation images on record 46 overlapped on the system axis. FIG. 1A further illustrates how the use of diametrically opposed pairs of sources doubles the effect of a single set of sources to cause a twofold increase in the intensity of each of the retrieved color separation images.

It is evident from FIGS. 1 and 1A and from the above discussion that the diaphragm 48 effectively acts as an adjustable spatial filter, transmitting one of the first harmonic diffraction orders associated with each of the point sources while excluding all of the unwanted diffracted orders.

By adjusting the resistors 56, 58, and/or 60 to the zero voltage positions, a selected one or combination of light source pairs may be energized—thus, one or a scheduled combination of the color separation images stored on the record 46 may be retrieved in any desired intensity proportion. By viewing the record through the diaphragm 48, a reconstruction in natural or selectively distorted color may thus be seen.

By this invention, it is evident that the limiting aperture of the optical system does not impose, in practice, a constraint upon either the resolution of the retrieved images or on the number of images which may be recorded on the record 46 and separately retrieved.

Figure 2:
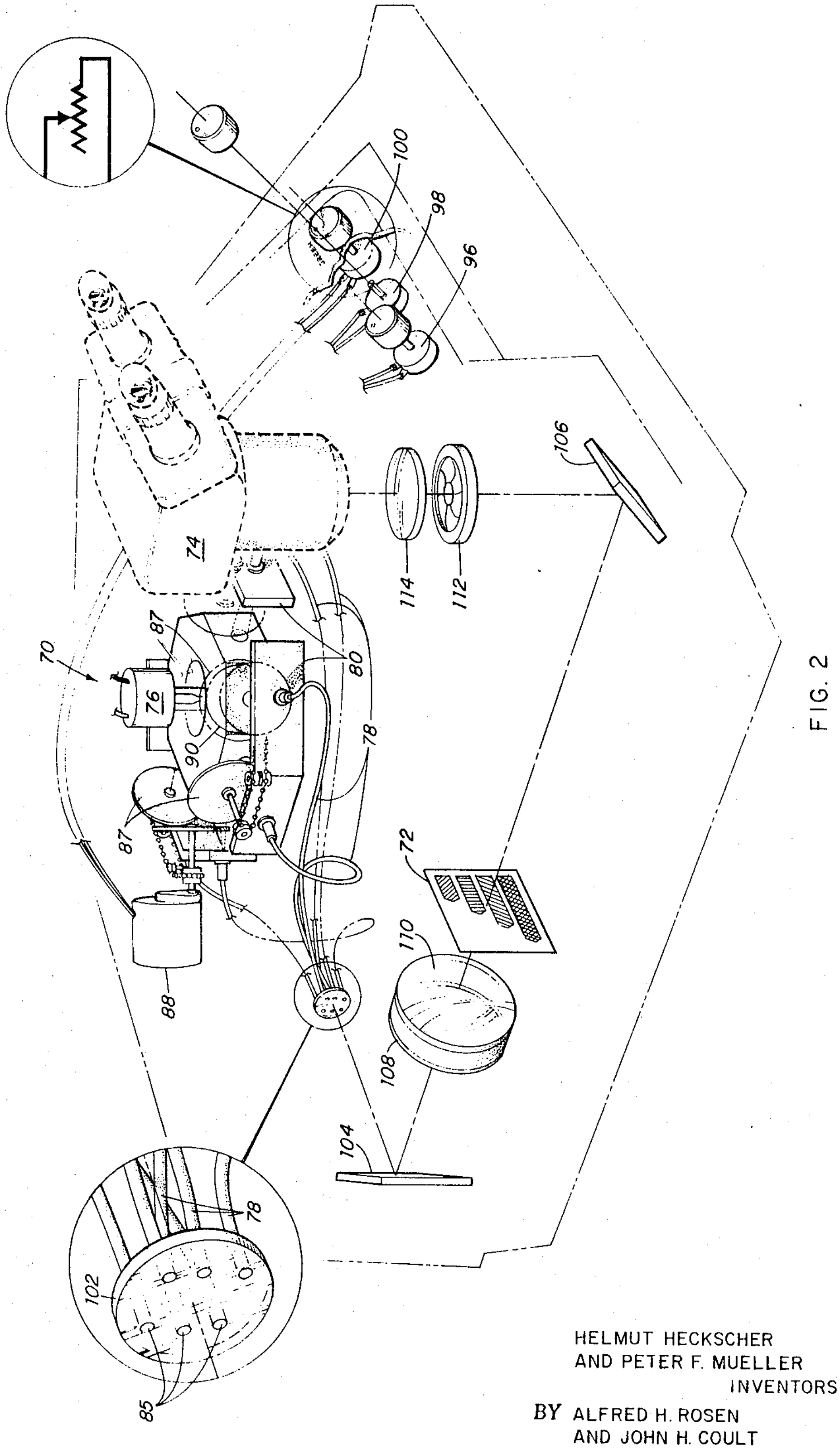
FIG. 2 is a perspective view showing a preferred embodiment of viewing apparatus implementing the inventive concepts.

FIG. 2 shows an embodiment of the invention whicn is quite similar in concept to the FIG. 1 embodiment, but which is intended to illustrate a more practicable structure. FIG. 2 illustrates binocular viewing apparatus comprising a light generating module 70, an optical detection system for selectively retrieving carrier modulated component images from a composite record 72, and a binocular viewer 74 for viewing images retrieved by the detection system.

In more detail, the light generating module 70 illustrates an arrangement for producing a plurality of intense effective point sources of partially coherent radiation—the illustrated light source arrangement is the invention of Michael Graser, Jr., claimed in copending patent application Ser. No. 705,431, filed Feb. 14, 1968. The module 70 comprises a high intensity xenon arc lamp 76 which is surrounded by an octagonal array of light transmitting optical fibers 78. The illustrated module 70 is capable of producing eight effective point sources; however, only six are utilized in the particular application shown. Referring to FIG. 3, together with FIG. 2, the ends of the optical fibers 78 are supported in a plurality of mounting plates 80 with their input ends each addressing the lamp arc 81 through an intermediate optical system comprising condensing lens elements 82 and 84 which serve to image the lamp arc 81 into the exposed end of the registered optical fiber.

In order that the light transmitted by each of the fibers have a particular mean wavelength, a spectral filter 86 is included in each of the collimated beams between lens element 82 and 84. Whereas only one of the sets of lens elements 82 and 84 are illustrated, it should, of course, be understood that a like set of elements is provided for imaging the arc into the input end of each of the six optical fibers employed.

By an appropriate disposition of spectral filters 86 having mean wavelengths in the red, blue, and green regions of the visible spectrum, the output ends 85 of the optical fibers 78 are caused to emanate red, blue, and green light in three sets of diametrically opposed pairs of sources.

As discussed with respect to the FIG. 1 embodiment, it is desirable to be able to adjust the relative intensity of the individual point light sources and thus of the retrieved images. To this end, there are provided six continuously varying neutral density filters 87 mounted for rotation through the respective inputs to the optical fibers 78. In order that these filters 87 may be adjusted from a remote position, a plurality of D.C. stepping-type motors 88, 90, and 92 are provided. The optical fibers 78 are arranged such that cooperating pairs of fibers which are diametrically arranged at the input to the optical detection system (at the output of the fibers) are caused to be adjacent in the module 70 to facilitate intensity control by a common motor. Three manually operable potentiometers 96, 98, and 100, mounted on the operator's panel, provide means for controlling the motors 88, 90, and 92, and thus the relative intensity of the retrieved color separation images.

The optical detection system illustrated is very similar to the system shown in FIG. 1, and includes three pairs of diametrically located point sources of partially coherent radiation arranged in a 0°–45°–135° configuration corresponding to the angular geometry of the direction vectors of the spatial carriers on the record 72. The point sources are formed by mounting the ends of the optical fibers 78 in a mounting element, which may, for example, be a Plexiglas disk 102. "Plexiglas" is a registered trademark of Rohm and Haas Co.

The optical detection system includes a pair of mirrors 104 and 106 for compacting the system light path. A collimating lens 108 and a transform lens 110 function, as in the FIG. 1 embodiment, to form a composite diffraction pattern of the record (see FIG. 1A) on a diaphragm 112. By this invention, as described with reference to the FIG. 1 embodiment, the first diffraction orders associated with each of the color separation records will fall on the diaphragm aperture when the appropriate pair of point sources is energized. A lens 114 functions to image the record 72 within the binocular viewer 74 for magnification by the viewer optics.

Yet another embodiment of the inventive concepts is illustrated (schematically) in FIG. 4. The FIG. 4 embodiment is adapted to selective retrieve from a composite record 116 a desired one of a relatively large number of distinct component record images respectively multiplied with a spatial carrier of unique azimuthal orientation. This concept of optical image storage and retrieval is the invention of Peter F. Mueller described and claimed in patent application Serial No. 510,807, filed Dec. 1, 1965, now Patent No. 3,425,770. In such a system, the number of images which may be superimposed and then selectively retrieved with a given spatial frequency bandwidth, is (using prior art techniques) a function of the carrier frequency employed, as discussed above in the introductory portion of this application. Following the prior art, the required effective aperture of the necessary optical detection system would become prohibitively large with only a relatively modest number of component images on the record. By this invention, the effective point light sources are located sufficiently angularly displaced from the optical axis 0—0 that a first diffraction order of each of the retrieved images is located on the optical axis, and thus the aperture requirements are very modest and independent of the number of carrier-modulated images which are stored on the record. The FIG. 4 system is illustrated as including a light source arrangement comprising twelve optical fibers 118 arranged in a circular array. A Plexiglas disk 120 is illustrated as providing a mounting means for supporting the output ends of the fibers 118. A collimating lens 122 and a transform lens 124 form an image of the point source array upon an iris-type diaphrgam 126 acting as a spatial filter. A projection lens 128 is included to illustrate that the selectively retrieved images may be displayed upon a screen 130 as an alternative to being viewed with a naked eye or through a microscope or other viewing device.

In the interest of simplicity the illustrated light source arrangement is not shown has having the capability of energization of various combinations of sources, or of variation of the intensity of the retrieved images, but is shown merely as including a selector 132 for effecting a selective energization of a desired one of the light sources to effect a retrieval of the component record image whose carrier modulation has a vectorial direction corresponding to the azimuthal orientation of the energized point light source.

FIG. 4A schematically illustrates a light source arrangement which might be incorporated in the FIG. 4 embodiment to provide the capability of selective retrieval at a given time of any desired combination of the component images stored on the record 116. Such a capability would be useful to adapt the FIG. 4 device for use as a teaching aid to enable sub-system or sub-component images to be visually overlaid for inspection of geometrical, physiological, or other relationships existing therebetween.

The FIG. 4A arrangement is illustrated as comprising a plurality of optical fibers 136 mounted in a Plexiglas disk 140. A plurality of light sources 142 for feeding the input ends 144 of the optical fibers 136 and an array of switches 146 illustrates diagrammatically how one or any combination of the optical fibers 136 might be selectively energized to effect retrieval of the desired combination of component images from the photostorage record. Twelve fibers are shown. The fibers may be arranged in diametrically opposed pairs, as are the fibers 118 in the FIG. 4 embodiment, or for example, might be arranged in a diametrically staggered relationship to enable twelve component record images to be selectively retrieved from a record such as record 116 having twelve (rather than six) component images additively superimposed thereon in respective multiplication with twelve angularly distinct spatial carriers. It is evident that with such a staggered arrangement of effective sources, a single harmonic diffraction order associated with each of the component record images, rather than a pair of diffraction orders, will be retrieved.

The invention is not limited to the particular details of construction of the embodiments depicted and it is contemplated that various and other modifications will appear to those skilled in the art. For example, the light source arrangement might take the form of a single source displayed radially a predetermined distance from the optical axis and mounted for angular rotation to various indexed azimuthal positions to effect consecutive retrieval of selected component record images. Or still another embodiment might provide for rotation of the record to effect a correlation of the azimuth of a selected carrier vector with that of a fixed radially offset source. Other means for generating a source or sources of light of sufficient coherence are contemplated. Certain other changes may be made in the above-described apparatus without departing from the true spirit and scope of the invention herein involved, and it is therefore intended that the subject matter of the above depiction may be interpreted as illustrative and not in a limiting sense.

We claim:

1. In optical viewing or display apparatus having an optical axis, the combination comprising:
- a film gate for supporting on said axis a record which includes a plurality of superimposed component record images each modulating a spatial carrier, the direction vectors of said carriers having a predetermined angular separation;
- light source means for illuminating the record with light beams effectively emanating from a corresponding plurality of angularly separated sources, each of said beams being angled obliquely to said axis and having at least partial coherence at said film gate;
- lens means for forming in a Fourier transform space a corresponding plurality of diffraction patterns of the record, each comprising a corresponding plurality of Dirac delta function arrays having an angular separation related to said predetermined angular separation of said carrier direction vectors, each delta function array being convolved with a spectrum of spatial frequencies characterizing a diffeernt one of the component record images;
- means for effecting an azimuthal alignment of said light sources and the carrier vectors of said component record images;
- means for effecting an angulation of each of said beams with respect to said axis which is appropriate to locate a predetermined harmonic diffraction spectrum of each of said component images on said axis;
- spatial filter means including mask means disposed in said transform space, said mask means defining an opening located on said axis to selectively pass said predetermined diffraction spectra of each of said component images; and
- said light source means including means to energize at a given time any one of or combination of said separated sources to retrieve the component record image or images associated with the energized separated source or sources.

2. The apparatus defined by claim 1 wherein said light source means includes adjustable means for varying the relative effective luminous energy output of said separated sources.

3. The apparatus defined by claim 2 wherein said superimposed component record images comprise color separation images of a colored scene.

4. The apparatus defined by claim 3 including a plurality of spectral filter means having respective spectral band pass regions corresponding respectively to the bands of frequencies associated with said color separation images, said filter means being interposed in said beams before said film gate such that the said diffraction spectrum of each of the color separation images is formed in light having a mean wavelength related to the color of the particular color separation image.

5. The apparatus defined by claim 2 wherein said superimposed component record images represent different objects, wherein by selective energization of said light source means any selected combination of said component record images may be retrieved.

6. The apparatus defined by calim 5 including color filters having different spectral characteristics located in said beams for color coding said component record images upon retrieval such that said component record images are retrieved in light having mutually exclusive spectral characteristics.

7. A method for viewing or displaying component record images stored on a record which includes a plurality of superimposed component record images each modulating a spatial carrier, the direction vectors of said carriers having a predetermined angular separation, comprising:
- illuminating the record on an optical axis with light beams effectively emanating from a corresponding plurality of angularly separated light sources each of said beams being angled obliquely to said axis and having at least partial coherence at the record;
- forming in a Fourier transform space a corresponding plurality of diffraction patterns of the record, each comprising a corresponding plurality of Dirac delta function arrays having an angular separation related to said predetermined angular separation of said carrier direction vectors, each delta function array being convolved with a spectrum of spatial frequencies characterizing a different one of the component record images;
- effecting an azimuthal alignment of said light sources and the carrier vectors of said component record images;
- effecting an angulation of each of said beams with respect to said axis which is appropriate to locate a predetermined harmonic diffraction spectrum of each of said component images on said axis;
- selectively passing through said transform space in the region of said axis at least portions of said predetermined diffraction spectra of each of said component images; and
- selectively energizing at a given time one or more of the light sources to retrieve the associated component record image or images.

8. A method as defined in claim 7 including adjusting the effective relative luminous energy output of said light sources.

References Cited

UNITED STATES PATENTS

| | | | |
|---|---|---|---|
| Re. 20,748 | 6/1938 | Bocca | 350—162 |
| 3,155,001 | 11/1964 | Sites | 352—66 |
| 3,425,770 | 2/1969 | Mueller et al. | 350—162 |
| 3,314,052 | 4/1967 | Lohmann | 340—173 |

LEONARD FORMAN, Primary Examiner

S. L. STEPHAN, Assistant Examiner

U.S. Cl. X.R.

350—162; 353—30, 31, 35